United States Patent [19]

Brenneke

[11] 3,722,897
[45] Mar. 27, 1973

[54] CIRCUMFERENTIALLY EXPANSIBLE OIL RING

[75] Inventor: Arthur M. Brenneke, New Castle, Ind.

[73] Assignee: TRW INC., Cleveland, Ohio

[22] Filed: June 25, 1970

[21] Appl. No.: 49,664

[52] U.S. Cl. ................. 277/154, 277/148, 277/199
[51] Int. Cl. ................................................ F16j 9/12
[58] Field of Search......177/148, 154, 138, 139, 146, 177/149, 150, 164, 140, 141, 192, 198, 199, 222

[56] References Cited

UNITED STATES PATENTS

| 3,261,612 | 7/1966 | Games | 277/154 |
| 2,280,745 | 4/1942 | Bowers | 277/223 |
| 2,266,742 | 12/1941 | Crawford | 277/192 |

Primary Examiner—Joseph R. Leclair
Assistant Examiner—Robert I. Smith
Attorney—Hill, Sherman, Meroni, Gross & Simpson

[57] ABSTRACT

A circumferentially expansible oil control channel type piston ring composed of individual linked together circumferential ring portions or units. Each circumferential ring portion or unit has axially spaced top and bottom segments with outer peripheral edges providing scraping surfaces to ride on the cylinder wall. The segments of each unit are connected by an upstanding leg on the inner periphery of the ring. A spring finger extends from the leg of each portion between the segments of the next adjacent portion and terminates in an upstanding strut with ends seated in holes or recesses of the segments of the adjacent portion to link the portions together. The upstanding struts have shoulders supporting the segments against axial collapse. The ring is continuous and the holes or recesses receiving the ends of the struts are oversized to allow appreciable expansion of the ring so that it may fit over a piston head and snap into the ring groove of the piston. The ends of the struts abut the walls of the recesses or holes before the ring reaches its operating diameter so that further contraction can only be accommodated by deflection of the spring fingers, thereby providing a circumferentially expansible spring ring especially suited for the oil control ring of an internal combustion engine piston.

8 Claims, 7 Drawing Figures

Patented March 27, 1973
3,722,897
2 Sheets-Sheet 1
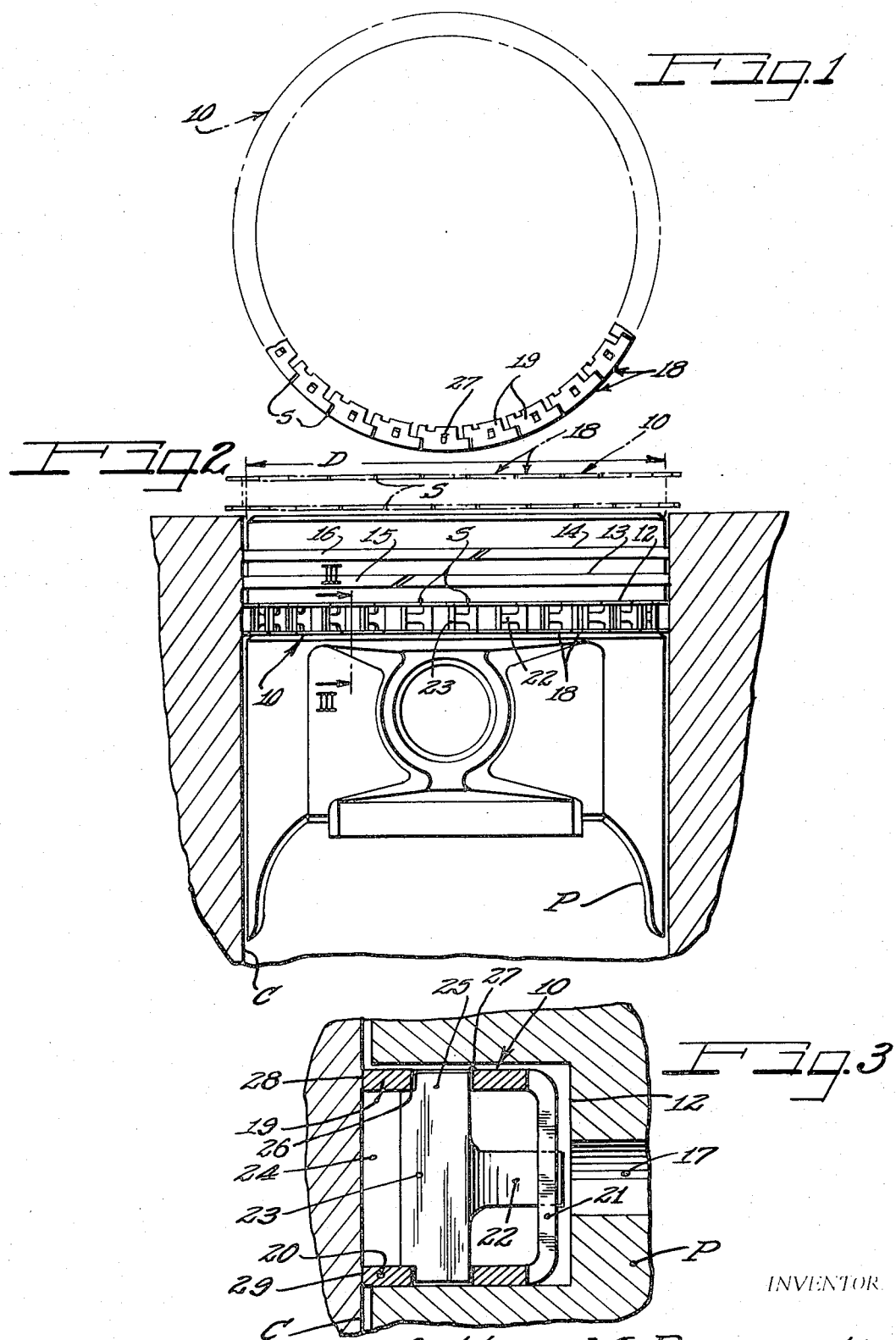
INVENTOR
Arthur M. Brennecke
BY Hill, Sherman, Meroni, Gross & Simpson
ATTORNEYS

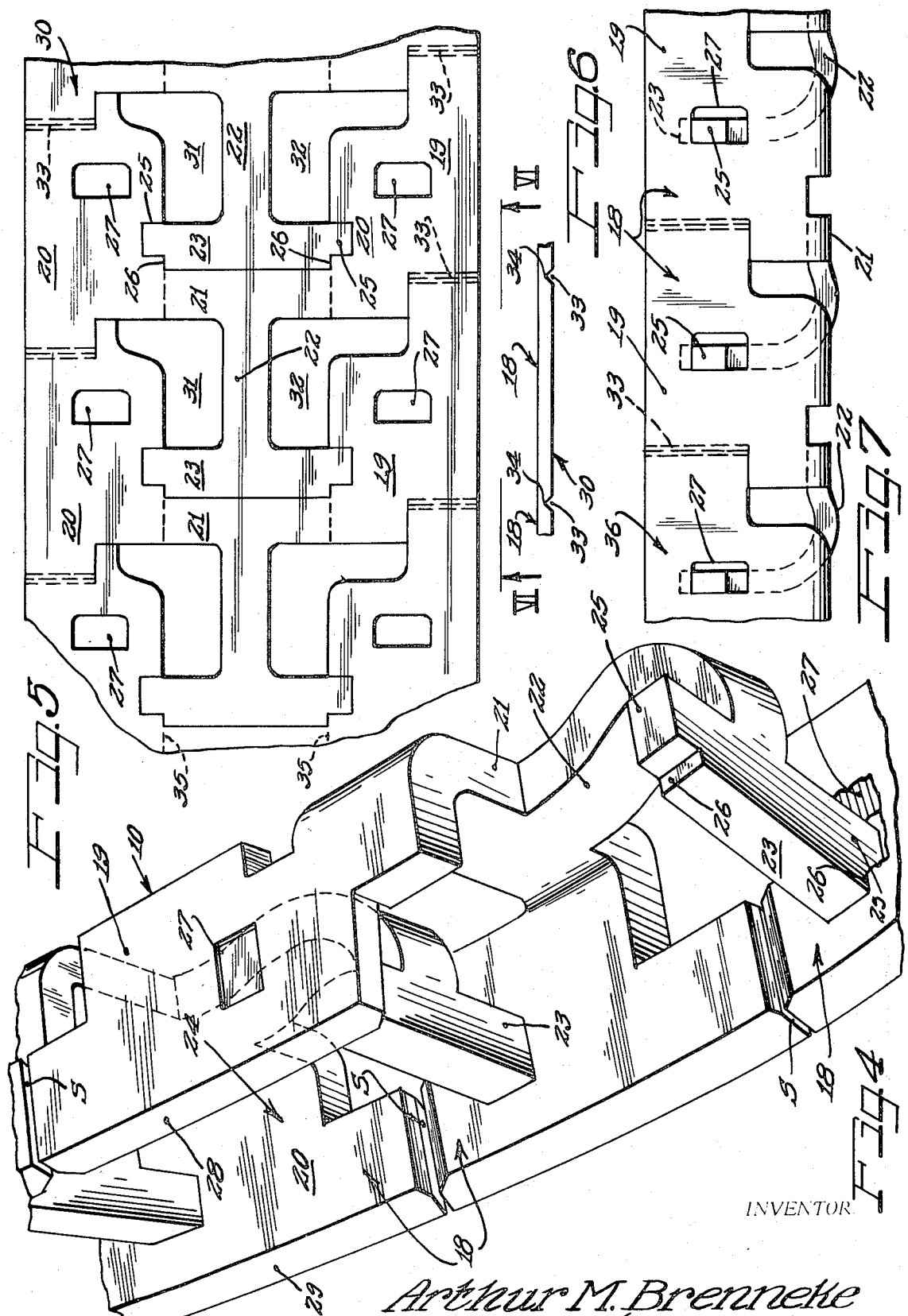

CIRCUMFERENTIALLY EXPANSIBLE OIL RING

BACKGROUND OF THE INVENTION

1. Field of the Invention

This invention pertains to the art of circumferentially expansible packing or piston rings especially suitable for oil control in internal combustion engine piston and cylinder assemblies. Particularly, the invention deals with a U-shaped or channel oil control ring composed of linked together circumferential portions, each having top and bottom segments or crowns with peripheral scraping edges and linked to an adjacent portion through spring finger carried upstanding struts seated in oversized holes in the segments or crowns.

2. Description of the Prior Art

Circumferentially expansible piston rings composed of individual cells, strung like beads on a tie wire, and urged apart by coil springs, are known, for example, in the F. C. Crawford U.S. Pat. No. 2,239,703 dated Apr. 29, 1941. These rings were split and their split ends had to be abutted together to provide an expansible ring. They were expensive, difficult to manufacture, extremely difficult to install, and required no less than three different types of components, namely, cells, springs and tie wire.

SUMMARY OF THE INVENTION

The present invention now provides a continuous circumferentially expansible piston ring which can be enlarged to slip over a piston head without distorting or straining the spring portions of the ring. The ring is composed of identical linked together individual arcuate units, each with its own integral spring portion and connecting member so that only one type of component is required. Each unit has a top and bottom radially extending segment or crown. Each segment or crown is provided with a peripheral scraping edge, and the top and bottom segments or crowns of each unit are connected by an upstanding leg at the inner periphery of the unit. A spring finger on each leg carries an upstanding strut on its free end seated in oversized recesses or holes in the segments or crowns of an adjacent unit to link together the units. A selected number of units of selected size are linked together to form a continuous ring for a particular installation so that the ring may be stretched enough to fit over the piston head and may be compressed enough to exert a sealing load on the cylinder without being bottomed in the ring groove.

The rings of this invention are conveniently formed from a single strip or ribbon of metal, such as piston ring steel, by successive punching the strip between the longitudinal edges thereof to form the holes, the legs, the spring fingers, the upstanding struts, and the crown contours without, however, separating the units. The punching operation includes the formation of transverse V-shaped grooves providing weakened portions that are later broken to separate the units. This feature makes possible the production of piston rings of this invention at high speeds by blanking out or stamping the flat steel ribbon or strip, bending the spring fingers to align the struts with the apertures, folding the strip into a U-shaped channel with the ends of the struts seated in the apertures, coiling the folded strip into circular form, cutting off strip lengths composed of the necessary number of units to form the desired ring, seating the ends of the strut of one end unit in the apertures of the other end unit to form a continuous ring, heat treating to harden the steel, fracturing the weakened portions at the bottoms of the grooves to separate the units, tempering the ring to provide the desired stiffness for the spring fingers, and finish grinding or lapping the periphery of the ring.

It is then an object of this invention to provide a packing ring composed of individual ring units linked together through integral spring fingers on each unit.

Another object of this invention is to provide a channel type oil control piston ring composed of individual channel units, each having a spring finger with an upstanding strut on the end thereof spanning the channel and seated in recesses of an adjacent unit to unite the segments.

Another object of this invention is to provide a packing ring composed of a continuous ring of individual units linked together through spring fingers on each unit.

A specific object of this invention is to provide a continuous channel type oil control piston ring composed of individual ring units connected by interfitting struts and recesses in adjacent units and having integral spring fingers providing a resiliently expansible continuous ring.

Another object of this invention is to provide a method of making piston rings composed of linked individual units from a continuous strip of metal fractured into the individual units only after the ring is hardened.

Another object of this invention is to provide a method of making a channel type oil control piston ring composed of linked together individual ring units from a single strip of metal provided with weakened sections that are easily fractured when the ring is hardened.

Other and further objects of this invention will become apparent to those skilled in this art from the following detailed description of the annexed sheets of drawings which, by way of a preferred example only, illustrate one embodiment of the invention.

BRIEF DESCRIPTION OF THE DRAWINGS

FIG. 1 is a plan view of a piston ring of this invention;

FIG. 2 is a side view, with parts in cross-section, of a piston and cylinder assembly including a piston ring of this invention and showing how the continuous ring may be stretched over the piston;

FIG. 3 is an enlarged fragmentary sectional view taken generally along the line III—III of FIG. 2;

FIG. 4 is an enlarged fragmentary perspective view of a portion of the ring of this invention with parts broken away to show underlying structure;

FIG. 5 is a plan view of a portion of a metal strip punched or stamped to form the ring of this invention;

FIG. 6 is an edge view of the strip of FIG. 5 taken generally along the line VI—VI of FIG. 5; and FIG. 7 is a fragmentary plan view of the strip of FIG. 5 after it is folded into channel shape according to this invention.

DESCRIPTION OF THE PREFERRED EMBODIMENT

A preferred piston ring 10 of this invention shown in FIG. 1 is composed of individual circumferentially separated ring units linked together to form a continuous ring. The ring 10 is of the outwardly opening channel ring type and is resiliently expansible to seal against the wall of an engine cylinder C such is shown in FIGS. 2 and 3. As therein shown, a piston P in the cylinder C has an oil ring groove 12 receiving the ring 10. Two additional ring grooves 13 and 14 are provided in the piston head receiving split compression rings 15 and 16 respectively. The piston head has a diameter D and the continuous ring 10 may be stretched beyond this diameter without damage so as to be slipped over the piston head and snapped into the oil ring groove 12. The split rings 15 and 16, of course, can be expanded over the head to snap in their respective grooves 13 and 14.

The oil ring groove 12 as shown in FIG. 3 is free draining and has holes or slots such as 17 connecting the bottom of the groove with the interior of the piston P. The ring 10 slides freely on the top and bottom side walls of the ring groove 12 and in operation is not compressed sufficiently to seat on the bottom of the ring groove.

As shown in FIG. 4, the ring 10 is composed of a ring of circumferentially spaced individual ring units 18. Each unit 18 is U-shaped and has a radially extending top crown or segment 19, a similar radially extending bottom crown or segment 20 spaced axially therefrom and circumferentially offset therefrom. The top and bottom crowns 19 and 20 of each unit 18 are connected by an axially extending, relatively narrow, leg 21 on the inner periphery of the ring. Each leg 21 has a circumferentially extending spring finger 22 on one side thereof about midway between the top and bottom crowns 19 and 20. This finger 22 terminates in an upstanding strut 23 in the channel 24 between the crowns 19 and 20. The strut 23 is positioned about midway of the radial depth of the ring. The strut 23 has notched ends 25 providing radial shoulders 26 axially inward from the ends of the strut. These ends 25 project into holes 27 in the crowns 19 and 20 and the inner faces of these crowns rest on the shoulders 26. The units 18 are separated by radial slots S between the crowns 19 and 20 with the slots S between the top crowns 19 circumferentially offset or in staggered relation to the slots S between the bottom crowns 20. The top crowns 19 have peripheral edges 28 and the bottom crowns have peripheral edges 29 providing the cylinder wall engaging scraping edges of the ring 10.

As shown in FIG. 5, the ring 10 is formed from a strip or ribbon 30 of piston ring steel by successively punching out the shapes of the individual units 18 in connected together relation. Thus, the holes 27 are punched out simultaneously with areas 31 and 32 on opposite sides of the spring fingers 22. At the same time, the ring is sliced to isolate the strut portions 23 from the crowns 19 and 20 and the legs 21. It will be noted that the ends 25 of the strut portions 23 extend into the crown areas 19 and 20 with the shoulders 26 at the inner edges of these crowns. The strip 30 is also cut to provide V-shaped grooves 33 extending transversely inward from opposite sides of the strip to the cut portions defining the inner peripheral edge of the segments 19 and 20, thereby forming weakened portions 34 at the bottoms of the grooves joining the successive units 18 as illustrated in FIG. 6.

The punched flat strip of FIGS. 5 and 6 next has the struts 23 lifted out of the plane of the strip and aligned with the holes 27 into which the ends 25 of the struts 23 are to be seated. This is accommodated by bending of the spring fingers 22.

Next, the strip 30 is folded along the dotted lines 35 into channel or U-shape and, as shown in FIG. 7, the ends of the struts are seated in the holes 27 and the crowns are at right angles to the legs 21. It will also be noted from FIG. 7 that the units 18 are still connected together at the grooved portions 33. This provides a continuous U-shaped channel strip 36.

Next, the strip 36 is coiled into a stacked helix form of ring diameter size. The strip may be induction heat-treated to harden the steel as it is being coiled or the stacked helix may be heat-treated in a furnace to harden the steel after coiling. Following the hardening treatment, the coils of the helix are subjected to a reverse bending operation to fracture the weakened portions 34, thereby separating the units 18. The ring of linked units is then wound on a tube and stretched to separate the units for providing gaps therebetween of the desired dimension. The stretched linked units on the tube are then subjected to a tempering treatment to set the spring fingers 22. After the tempering treatment, the wound coil is then separated into lengths containing the desired number of units for producing rings of the desired diameter by spreading the segments 19 and 20 apart at the desired unit, permitting removal of the strut 23 from its recesses 27, and the removed strut is then seated in the recesses of the segment at the other end of the series of units to form a continuous ring. The thus formed continuous rings are then subjected to finishing operations such as grinding, lapping and the like.

The recesses 27 freely receive the ends 25 of the struts to provide clearance accommodating stretching of the ring 10 over the piston head, as illustrated in FIG. 2, without stretching the fingers 22 beyond their elastic limits. When the ring is snapped into the ring groove and compressed into the cylinder, however, all of the struts will be bottomed in their respective holes or recesses, and the spring fingers will be loaded to exert an expanding action on the ring for maintaining the scraping edges 28 and 29 in sealing engagement with the cylinder wall. The slots S between the units 18 will be narrower than their free state width, and may even be closed.

From the above descriptions it will, therefore, be understood that this invention provides a continuous circumferentially expansible channel type oil control ring for internal combustion engine piston and cylinder assemblies composed of individual linked together identical units, each with its own integral spring and linking strut.

I claim as my invention:

1. A circumferentially expansible piston ring comprising a plurality of individual circumferentially separated ring units, each unit being of one piece having at least one integral spring portion and at least one integral linking portion, each unit linked to an adjacent unit through a mechanical interlock by a linking portion, and having non-spring portions remote from the linking portion.

2. The ring of claim 1 wherein each unit has a top and bottom radially extending crown, an upstanding leg on the inner periphery connecting the crowns, a spring finger extending circumferentially from one side of the leg, an upstanding strut on the end of the spring finger in the channel between the crowns and recesses receiving the ends of the strut.

3. The ring of claim 1 wherein each individual ring unit has top and bottom radially extending crowns in circumferentially offset relation defining an outwardly opening channel therebetween.

4. A channel type circumferentially expansible oil ring for pistons which comprises a continuous ring of circumferentially separated individual ring units, each unit having top and bottom crowns providing the scraping edges for the channel ring, an axially extending leg connecting the top crown with the bottom crown of each unit in circumferentially offset relation, each unit having a spring finger extending therefrom into the channel of the next adjacent unit, an upstanding strut on the end of each spring finger, recesses in each unit receiving the ends of the strut of the adjacent unit linking the units together, and shoulders on the struts engaging the crowns to hold the crowns in axially spaced parallel relation.

5. The piston ring of claim 4 wherein the strut of one unit fits freely in the recesses of the adjacent unit to accommodate expansion of the ring for fitting over the head of a piston without overstressing the spring fingers.

6. An oil control piston ring comprising a continuous ring of linked together individual one-piece circumferential units, each unit having an integral spring and linking portion consisting of less than the entire unit.

7. The ring of claim 3 wherein each unit has radially extending top and bottom crowns in circumferentially offset relation.

8. An outwardly opening channel piston ring comprising a plurality of individual separate one-piece ring units each unit having top and bottom radially extending crowns for riding on the side walls of a piston ring groove and providing peripheral scraping edges for riding on a cylinder wall, upstanding leg means connecting the crowns in axially spaced relation, and spring means linking the units into a circumferentially expansible spring.

* * * * *